United States Patent
Reichow et al.

(10) Patent No.: US 8,933,580 B2
(45) Date of Patent: Jan. 13, 2015

(54) ON-BOARD ELECTRICAL SYSTEM FOR A VEHICLE AND ALSO CONTROL APPARATUS FOR AN ON-BOARD ELECTRICAL SYSTEM

(75) Inventors: Dirk Reichow, Wenzenbach (DE); Tobias Steckermeier, Regensburg (DE); Tobias Galli, Roding (DE)

(73) Assignee: Continental Automotive GmbH, Hannover (DE)

( * ) Notice: Subject to any disclaimer, the term of this patent is extended or adjusted under 35 U.S.C. 154(b) by 288 days.

(21) Appl. No.: 13/382,190

(22) PCT Filed: Mar. 30, 2011

(86) PCT No.: PCT/EP2011/054935
§ 371 (c)(1),
(2), (4) Date: May 23, 2012

(87) PCT Pub. No.: WO2011/121035
PCT Pub. Date: Oct. 6, 2011

(65) Prior Publication Data
US 2013/0009461 A1    Jan. 10, 2013

(30) Foreign Application Priority Data

Mar. 30, 2010  (DE) .......................... 10 2010 013 458

(51) Int. Cl.
| | |
|---|---|
| *B60L 1/00* | (2006.01) |
| *B60L 3/00* | (2006.01) |
| *H02G 3/00* | (2006.01) |
| *H02J 7/00* | (2006.01) |
| *H02J 7/14* | (2006.01) |
| *H02J 7/34* | (2006.01) |
| *H02J 1/10* | (2006.01) |
| *B60L 11/18* | (2006.01) |

(52) U.S. Cl.
CPC ............. *H02J 7/0029* (2013.01); *H02J 7/1423* (2013.01); *H02J 7/345* (2013.01); *H02J 1/10* (2013.01); *B60L 3/0046* (2013.01); *B60L 11/1868* (2013.01); *H02J 2007/0037* (2013.01); *Y02T 10/7005* (2013.01); *Y02T 10/7066* (2013.01)
USPC ......................................................... 307/9.1

(58) Field of Classification Search
USPC ................. 307/9.1, 10.1; 320/136; 180/65.24
See application file for complete search history.

(56) References Cited

U.S. PATENT DOCUMENTS

| | | | |
|---|---|---|---|
| 5,387,857 A | | 2/1995 | Honda et al. |
| 5,710,699 A | * | 1/1998 | King et al. ..................... 363/132 |

FOREIGN PATENT DOCUMENTS

| | | |
|---|---|---|
| CN | 101373904 A | 2/2009 |
| EP | 1 130 737 A1 | 9/2001 |
| EP | 1 848 090 A2 | 10/2007 |
| JP | 2002-330545 A | 11/2002 |
| WO | 2010/130527 A1 | 11/2010 |

\* cited by examiner

*Primary Examiner* — Carlos Amaya
(74) *Attorney, Agent, or Firm* — Laurence A. Greenberg; Werner H. Stemer; Ralph E. Locher

(57) ABSTRACT

An electrical system has first and second switches. The switches are used by the electrical system to produce closed circuits from a first energy storage device and/or a second energy storage device to a system load to supply power to the system load. The electrical system has a device for detecting a voltage at the second energy storage device and for comparing the detected voltage with a voltage threshold, and also a control device for producing a third, closed circuit from the second energy storage device to an earth connection by closing the first and second switches, and therefore for discharging the second energy storage device when the detected voltage exceeds the voltage threshold. This prevents the second energy storage device from charging uncontrollably when a system fault occurs in the electrical system or on the current path from the first energy storage device to the second energy storage device.

7 Claims, 1 Drawing Sheet

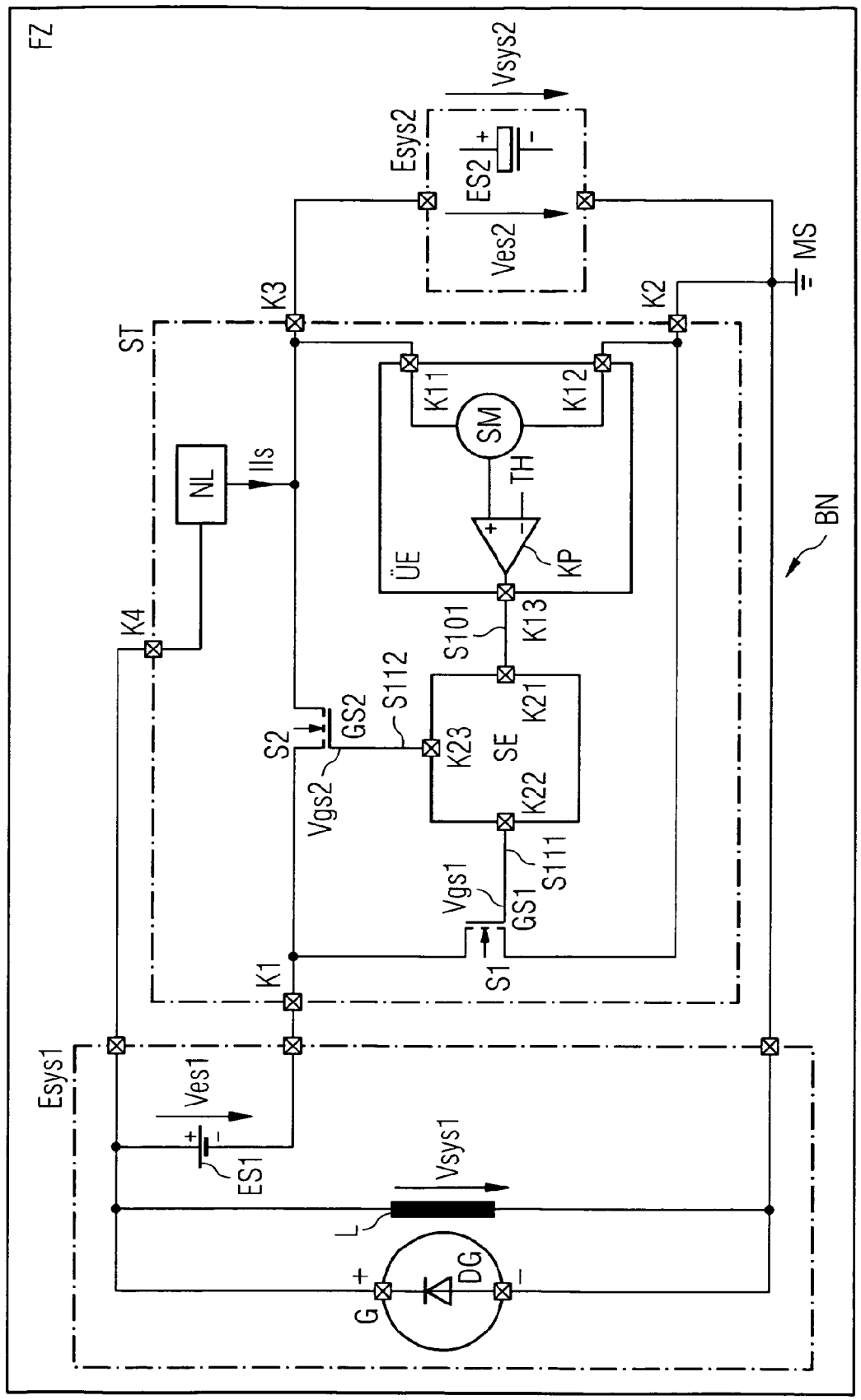

ON-BOARD ELECTRICAL SYSTEM FOR A VEHICLE AND ALSO CONTROL APPARATUS FOR AN ON-BOARD ELECTRICAL SYSTEM

BACKGROUND OF THE INVENTION

Field of the Invention

The invention relates to an on-board electrical system for a vehicle and also a control apparatus for controlling a current flow in an on-board electrical system of a vehicle. In addition, the invention relates to a vehicle, in particular a hybrid electric vehicle, with an abovementioned on-board electrical system and/or an abovementioned control apparatus.

On-board electrical systems in modern-day motor vehicles comprise a generator in the form of a three-phase machine with a downstream rectifier circuit as energy transducer and/or a first or primary energy store, which comprises one or more battery cells, for example, and also power consumers which are intended to be supplied with power via the on-board electrical system and which are referred to as system load, by way of summary. The generator, the first energy store and the system load are referred to, by way of summary, as the first energy system. In addition, the on-board electrical system comprises a second energy system, which comprises a second, i.e. secondary energy store, which is in the form of a double-layer capacitor, for example. The second energy store is charged with current by the first energy store, i.e. by the generator and/or by the first energy store. The system voltage of the first energy system is generally greater than that of the second energy system.

In an on-board electrical system, it is important to maintain a largely safe system state. One of the requirements for maintaining a safe system state in an on-board electrical system is to avoid overcharging of one of the two energy stores.

If, however, problems occur in the electrical connections between the two energy systems, or between the first energy store or the generator and the second energy store, which are caused, for example, by faults, aging or corrosion in one or other of the electrical components in the on-board electrical system, by incorrect usage or by environmental influences in the electrical connections, an uncontrolled current flow is produced from the first energy system to the second energy system or from the first energy store to the second energy store, and consequently the charging voltage at the second energy store increases beyond the maximum permissible charging voltage and up to the voltage potential at the first energy system or at the first energy store. This results in overcharging of the second energy store and consequently in failure of the second energy store.

BRIEF SUMMARY OF THE INVENTION

The object of the present invention therefore consists in providing the possibility of protecting the energy store of an on-board electrical system from overcharging in a simple manner in the event of the occurrence of one of the abovementioned problems.

This object is achieved by the independent claims. Advantageous developments are the subject matter of the dependent claims.

In accordance with a first aspect of the invention, an on-board electrical system is provided which comprises at least one power consumer, which is referred to as system load, a first energy store and a second energy store for providing current for the system load, the second energy store being rechargeable. In particular, the second energy store can be recharged with current from the first energy store.

In addition, the on-board electrical system comprises a first controllable switch and a second controllable switch. In a closed switching state, the first switch produces a first, closed circuit from the first energy store to the system load for supplying current to the system load from the first energy store. In an open switching state, the first switch opens this first circuit again. In a closed switching state and in particular when the first switch is open at the same time, the second switch produces a second, closed circuit from the first energy store via the second energy store to the system load for supplying current to the system load from the first energy store and from the second energy store. In an open switching state, the second switch opens this second circuit again.

In addition, the on-board electrical system has a monitoring device and a control device. The on-board electrical system uses the monitoring device to detect a charging voltage value at the second energy store and compares the presently detected voltage value with a predetermined voltage threshold value.

The control device then closes the first and second switches or keeps these two switches in a closed switching state, and thus produces a third closed circuit from the second energy store via the two closed switches and therefore discharges the second energy store when the presently detected voltage value exceeds the voltage threshold value. Advantageously, the second energy store is electrically connected, and discharged, to ground via the two closed switches.

As a result, an on-board electrical system is provided which can protect the energy stores from overcharging in a simple manner and merely using the components already existing in the on-board electrical system, such as the two switches, in the event of the occurrence of a fault in the on-board electrical system, with the result that said on-board electrical system can be produced at hardly any extra cost or increased manufacturing complexity.

In an advantageous configuration, the on-board electrical system has a recharging device which the on-board electrical system can use to charge the second energy store with a charging current from the first energy store.

This has the advantage that the on-board electrical system does not require any external recharging apparatus in order to charge one energy store of the on-board electrical system with current from the other energy store. A further advantage is that, owing to the internal recharging device, the charging operation of the energy store can be monitored, controlled and regulated by the on-board electrical system without any notable latency.

In a further advantageous configuration, the control device is designed in such a way that it discharges the current, which flows from the first energy system to the second energy system or from the first energy store to the second energy store, via the first, closed switch and the second, closed switch, and therefore via the third, closed circuit in the event that the presently detected voltage value exceeds the voltage threshold value. Advantageously, the current is discharged to ground (for example the vehicle body).

This has the advantage that the excessive current from the first energy system which results in overcharging of the second energy store can be removed safely away from the on-board electrical system and, for example, via the electrical ground without any additional circuit components.

In a further advantageous configuration, the monitoring device determines the voltage threshold value, with which the charging voltage value is compared, depending on at least one parameter, which is related to the charge capacity of the second energy store, such as the temperature at the second energy store, for example.

As a result, the maximum charging voltage value of the second energy store, which is dependent on the charge capacity or on the various parameters, whose voltage value changes result in a change in the charge capacity and therefore also in the maximum possible charging voltage value of the second energy store, is also taken into consideration when determining the voltage threshold value.

In a further advantageous configuration, the control device keeps the first switch and the second switch in the closed switching state for a predetermined period of time, wherein the control device predetermines this period of time depending on the presently detected voltage value in comparison with the voltage threshold value.

This firstly ensures that the excess electrical charges in the second energy store, which result in overcharging or in an overvoltage in this second energy store, can be safely discharged and secondly prevents the second energy store from discharging to too great an extent, which in turn results in an unnecessary loss of electrical energy and is therefore disadvantageous for the on-board electrical system.

In accordance with a further aspect of the invention, a control apparatus for controlling a current flow in an on-board electrical system is provided, said control apparatus having a first electrical terminal, a second electrical terminal and a third electrical terminal for producing electrical connections between the control apparatus and the on-board electrical system. The control apparatus has a first, controllable switch between the first and second terminals, said first controllable switch electrically connecting the first terminal to the second terminal in a closed state. The control apparatus has a second controllable switch between the first and the third terminal, said second controllable switch electrically connecting the first terminal to the third terminal in a closed state.

In addition, the control apparatus has a monitoring device and a control device. The monitoring device, which can also be referred to as a comparison device owing to its function for comparing two voltage values, detects a voltage value present between the third terminal and the second terminal of the control apparatus and compares the presently detected voltage value with a predetermined voltage threshold value and outputs the comparison result in the form of a signal with a signal level corresponding to this result to the control device. The control device closes the first switch and the second switch or keeps said first switch and said second switch in a closed switching state depending on the signal or, respectively, depending on the comparison result of the monitoring device. By virtue of the two switches being closed, the control apparatus connects the third terminal and the second terminal electrically to one another and thus discharges the current from the third terminal via these two closed switches to the second terminal.

In an advantageous configuration, the monitoring device determines the voltage threshold value, with which the voltage value is compared, depending on at least one environmental influence, such as the temperature, for example.

In a further advantageous configuration, the control device keeps the first switch and the second switch in the closed switching state for a predetermined period of time, which is predetermined by the control device depending on the presently detected voltage value in comparison with the voltage threshold value.

In accordance with a further aspect of the present invention, a vehicle, in particular a hybrid electric vehicle, with an above-described on-board electrical system or an above-described control apparatus is provided.

Advantageous configurations of the above-described on-board electrical system can also be regarded as advantageous configurations of the apparatus or the vehicle, insofar as they are applicable to the above-described apparatus or the above-mentioned vehicle.

In the text which follows, the invention will be explained in more detail with reference to an exemplary embodiment using a FIGURE. An on-board electrical system of a hybrid electric vehicle is used as an example.

BRIEF DESCRIPTION OF THE DRAWING

A single FIGURE shows a schematic illustration of an on-board electrical system in accordance with an exemplary embodiment.

DESCRIPTION OF THE INVENTION

The on-board electrical system BN of a vehicle FZ, in particular a hybrid electric vehicle, as shown in the FIGURE, comprises a first energy system Esys1 and a second energy system Esys2, and also a control apparatus ST which is connected inbetween these two energy systems Esys1, Esys2. The energy systems Esys1, Esys2 in this exemplary on-board electrical system BN are not electrically isolated from one another. Alternative embodiments with energy systems Esys1, Esys2 which are electrically isolated from one another are also possible.

The first energy system Esys1 comprises a generator G, a first energy store ES1 of the on-board electrical system BN and a group of power consumers, such as lamps or starter motors for internal combustion engines, which are referred to as system load L, by way of summary.

The generator G is in the form of a three-phase machine with a downstream rectifier circuit DG and acts as energy transducer for converting the kinetic energy from the vehicle FZ into electrical energy and at the same time as first energy source for supplying current to the system load L.

The first energy store ES1 comprises one or more rechargeable battery cells which are connected in series and acts as second energy source for supplying current to the system load L. The first energy store ES1 is charged with current by the generator G and therefore stores the electrical energy converted by the generator G.

The second energy system Esys2 comprises a further, i.e. a second energy store ES2 of the on-board electrical system BN. The second energy store ES2 is in the form of a double-layer capacitor and acts as third energy source, likewise for supplying current to the system load L. The second energy store ES2 is charged with current by the generator G and/or by the first energy store ES1.

The two energy systems Esys1, Esys2 have different system voltages Vsys1, Vsys2, wherein the system voltage Vsys1 of the first energy system Esys1 is greater than the system voltage Vsys2 of the second energy system Esys2.

In a fault-free operating state, in which the system load L is supplied with current by the generator G and the first energy store ES1, the first system voltage Vsys1 of the first energy system Esys1 is identical to the charging voltage Ves1 of the first energy store ES1. The second system voltage Vsys2 is equal to the charging voltage Ves2 of the second energy store ES2.

The control of the current flow in the respective energy system Esys1, Esys2 and between these two energy systems Esys1, Esys2 is brought about by the control apparatus ST.

For this purpose, the control apparatus ST has four electrical terminals K1, K2, K3, K4, which serve to produce electrical connections between the control apparatus ST and the on-board electrical system BN or the two energy systems Esys1, Esys2.

The control apparatus ST is electrically connected to the negative terminal of the first energy store ES1 via the first electrical terminal K1.

The control apparatus ST is electrically connected to the negative terminal of the rectifier DG of the generator G, to the negative terminal of the second energy store ES2, to the system load L, and to electrical ground MS via the second electrical terminal K2.

The control apparatus ST is electrically connected to the positive terminal of the second energy store ES2 via the third electrical terminal K3. Therefore, the voltage between the positive terminal and the negative terminal of the second energy store ES2, i.e. the charging voltage Ves2 of the second energy store ES2, is present between the third terminal K3 and the second terminal K2.

The control apparatus ST is electrically connected to the positive terminal of the rectifier DG of the generator G, to the positive terminal of the first energy store ES1 and to the system load L via the fourth electrical terminal K4.

The control apparatus ST also comprises a first controllable switch S1 and a second, controllable switch S2, a control device SE for controlling the two switches S1 and S2, a monitoring device ÜE for monitoring the charging voltage Ves2 from the second energy store ES2 and a recharging device NL for charging the second energy store ES2 with current from the generator G and/or from the first energy store ES1.

The two switches S1 and S2 are in the form of normally off MOSFET semiconductor switches which can be controlled via the respective gate or control terminal GS1, GS2. In the event of the presence of a gate voltage or control voltage Vgs1, Vgs2 at the respective control terminal GS1, GS2 with a voltage value of 5V, for example, these two switches S1, S2 are on, i.e. transfer to a "closed" switching state, and in the event of a discontinuation of the control voltage Vgs1, Vgs2 or in the event of the presence of a control voltage Vgs1, Vgs2 with an insufficient voltage value of below 5V, for example, said switches are off, i.e. transferred to an "open" switching state.

The first switch S1 is arranged between the first terminal K1 and the second terminal K2 and connects the first terminal K1 and the second terminal K2 electrically to one another in a closed switching state. Therefore, the first switch S1 produces a first closed circuit from the first energy store ES1 to the system load L in the closed switching state, with the result that the system load L is supplied with current from the first energy store ES1. In an open switching state, the first switch S1 interrupts the electrical connection between the first energy store ES1 and the system load L, with the result that the closed first circuit is opened.

The second switch S2 is arranged between the first terminal K1 and the third terminal K3 and connects the first terminal K1 and the third terminal K3 electrically to one another in a closed switching state. Therefore, the second switch S2 connects the second energy store ES2 to the first energy store ES1 and to the system load L electrically in the closed switching state and when the first switch S1 is at the same time open and therefore produces a second closed circuit from the first energy store ES1 via the second energy store ES2 to the system load L. In an open switching state, the second switch S2 interrupts the electrical connection between the second energy store ES2 and the first energy store ES1 and the system load L, with the result that the closed second circuit is opened.

The two switches S1, S2 are driven via the control device SE. The control device SE has a signal input K21 and two signal outputs K22, K23. The control device SE is electrically connected to the monitoring device ÜE via the signal input K21. The control device SE controls the first switch S1 via the first signal output K22 or with a first output signal S111 at the first signal output K22 and controls the second switch S2 via the second signal output K23 or with a second output signal S112 at the second signal output K23.

The monitoring device ÜE has two signal inputs K11, K12 and a signal output K13. The monitoring device ÜE is electrically connected to the third terminal K3 of the control apparatus ST and therefore also to the positive terminal of the second energy store ES2 via the first signal input K11. The monitoring device ÜE is electrically connected to the second terminal K2 of the control apparatus ST and therefore also to the negative terminal of the second energy store ES2 and the electrical ground MS via the second signal input K12. The monitoring device ÜE is electrically connected to the signal input K21 of the control device SE via the signal output K13.

Between the two signal inputs K11, K12, the monitoring device has a voltage measuring unit SM, which measures a potential difference between the two signal inputs K11 and K12, and therefore the charging voltage value Ves2 of the second energy store ES2. Between the voltage measuring unit SM and the signal output K13 of the monitoring device ÜE, the monitoring device ÜE also has a comparator unit KP. The comparator unit KP is electrically connected to the voltage measuring unit SM via the non-inverting, positive input. A voltage threshold value TH is applied to the inverting, negative input of the comparator unit KP. The comparator unit KP compares the presently measured charging voltage value Ves2 present at the positive input with the voltage threshold value TH present at the negative input and outputs a signal S101 with a signal level corresponding to the comparison result via the signal output K13, depending on the comparison result.

The recharging device NL is arranged between the fourth terminal K4 and the third terminal K3 of the control apparatus ST and comprises a DC/DC converter (not illustrated in any more detail in the FIGURE). The second energy store ES2 is charged with current from the generator G and/or from the first energy store ES1 via this recharging device NL.

Since the components of the on-board electrical system BN of the exemplary embodiment illustrated in the FIGURE, and the function thereof, have now been described, the mode of operation of the on-board electrical system BN or of the control apparatus ST of the on-board electrical system BN will be described in more detail below.

The on-board electrical system BN is operated in three different operating states, depending on the magnitude of the system load L, i.e. depending on the amount of power required by the power consumers connected to the on-board electrical system BN. These three operating states and changeover operations between these operating states will now be described below.

In a first operating state, in the on-board electrical system BN, the system load L is supplied with current by the generator G and by the first energy store ES1. In this operating state, the first energy store ES1 together with the generator G maintains a stable operating voltage in the on-board electrical system BN. The first switch S1 is kept in the closed state, controlled by the control device SE. The second switch S2 is kept in the open switching state, controlled by the control device SE.

In a second operating state, in which the power consumption in the on-board electrical system BN increases severely in a short period of time owing to one or more high-capacity power consumers, such as a starter motor for an internal combustion engine of the vehicle FZ, being connected into the circuit, the generator G and the first energy store ES1 can no longer manage the severely increased power requirement of the system load L on their own. As a result, a stable on-board system voltage in the on-board electrical system BN can no longer be maintained and there is the risk of a voltage dip below a minimum required operating voltage for fault-free operation of all of the power consumers. In this case, the second energy system Esys2 or the second energy store ES2 is connected into the on-board electrical system BN. The connection of the second energy store ES2 into the on-board electrical system BN takes place by simultaneous switchover of the two switches S1 and S2 by the control device SE. By the first switch S1 being opened at the same time as the switch S2 is closed, the control device SE connects the second energy store ES2 to the first energy store ES1 and the system load L and thus produces a second closed circuit from the first energy store ES1 via the second energy store ES2 to the system load L. As a result, the system load L is supplied with current by the generator G and the two energy stores ES1, ES2.

In the first operating state, in which the second energy store ES2 is not connected into the on-board electrical system BN, said second energy store is charged with current from the generator G or from the first energy store ES1, if required. In the process, the recharging device NL monitors and controls the charging operation.

If, however, a system fault occurs in the recharging device NL or in the electrical connection between the fourth terminal K4 and the third terminal K3, and therefore between the generator G or the first energy store ES1 and the second energy store ES2, an uncontrolled current flow is produced, i.e. an uncontrollable charging current IIs from the generator G and/or from the first energy store ES1 via the electrical connection between the fourth terminal K4 and the third terminal K3 and to the second energy store ES2. As a result, the second energy store ES2 is charged, and the charging voltage value Ves2 at the second energy store ES2 increases in an uncontrolled manner beyond the maximum permissible charging voltage and up to the voltage potential Ves1 at the first energy store ES1. This results in overcharging of the second energy store ES2 and consequently in failure of the second energy store ES2.

In order to prevent overcharging of the second energy store ES2 in such a faulty system state and therefore to protect the second energy store ES2 from failure, the voltage measuring unit SM of the monitoring device ÜE measures the charging voltage value Ves2 of the second energy store ES2 via the terminals K3, K2 and at predetermined time intervals.

The measured charging voltage value Ves2 is passed on from the voltage measuring unit SM to the comparator unit KP. The comparator unit KP then compares the charging voltage value Ves2 with a predetermined voltage threshold value TH, which is stored in a memory unit (not illustrated in any more detail in this FIGURE) of the control apparatus ST, and gives the comparison result in the form of an output signal S101 with a signal level corresponding to the comparison result to the control device SE.

If the charging voltage value Ves2 is less than or equal to the voltage threshold value TH, the output signal S101 has a signal level of logic ZERO. If the charging voltage value Ves2 exceeds the voltage threshold value TH, the output signal S101 assumes a signal level of logic ONE.

The output signal S101 of the monitoring device ÜE is now received by the control device SE via the signal input K21. Then, the control device controls the two switches S1 and S2 via the two output signals S111 and S112, depending on the signal level of this output signal S101.

If the control device SE receives the output signal S101 with a signal level of logic ZERO, said control device controls the two switches S1, S2 depending on the present operating state of the on-board electrical system BN, i.e. depending on how high the required current level in the on-board electrical system BN is.

If the control device SE receives the output signal S101 with a signal level of logic ONE, said control device closes the two switches S1, S2 independently of the present operating state of the on-board electrical system BN, i.e. independently of which switching states these two switches S1, S2 are intended to have in this present operating state. For this purpose, the control device SE sets the signal level of the two output signals S111, S112 to logic ONE and thus closes the two switches S1, S2. If the on-board electrical system BN is in the second operating state and the first output signal S111 is already at the signal level of logic ONE, the control device SE maintains the signal level with this output signal S111 and merely sets the second output signal S112 to the signal level of logic ONE. As a result, the control device SE keeps one switch S1 in the closed switching state, namely that switch which is already in the closed switching state prior to identification of an overcharging situation in the second energy store ES2, and closes the other switch S2 as well.

As a result, the terminals K3, K1 and K2 are short-circuited electrically with respect to one another and a closed, third circuit from the positive terminal of the second energy store ES2 to the electrical ground MS is formed. As a result, the second energy store ES2 is discharged via this closed third circuit. Preferably, the discharge takes place via the electrical ground MS, for example via the vehicle body (not illustrated in any further detail here), which is also designated by terminal 31, the excessive electrical charge being discharged from the second energy store ES2 via this closed third circuit to ground MS.

The charging current IIs from the terminal K4 to the terminal K3 or to the second energy store ES2 is discharged via the electrical connection from the third terminal K3 via the first terminal K1 and the second terminal K2 to the electrical ground MS.

As a result, the second energy store ES2 is protected from overcharging in two respects. Firstly, the excessive electrical charge in the second energy store ES2 is discharged by controlled discharge of the second energy store ES2 and is rendered harmless in respect of overcharging of the second energy store ES2. Secondly, the current IIs, which flows in an uncontrolled manner from the generator G or the first energy store ES1 to the second energy store ES2 as a result of system faults in the electrical connection, is discharged and is likewise rendered harmless.

As soon as the charging voltage value Ves2 falls below the voltage threshold value TH again or as soon as the discharge current falls below a determined current threshold value or as soon as a determined period of time has elapsed, the monitoring device ÜE sets the signal level of the output signal S101 from logic ONE to logic ZERO again. If the control device SE receives the output signal S101 with a signal level of logic ZERO, said control device controls the two switches S1, S2 depending on the present operating state of the on-board electrical system BN again, i.e. depending on how high the level of power requirement in the on-board electrical system BN is at present.

In an alternative embodiment, the monitoring device ÜE also detects other parameters, such as temperature, for example, in addition to the charging voltage value Ves2, at the second energy store ES2, the change in voltage value thereof resulting in a change in the charge capacity of the second energy store ES2. On the basis of the charging voltage value Ves2 and the presently detected parameter values, the monitoring device ÜE identifies whether the second energy store ES2 has completely charged or whether there is a risk of overcharging.

On the basis of this information which has been detected by the monitoring device ÜE from the charging voltage value Ves2 and from further parameter values, the monitoring device ÜE calculates the required period of time T for discharging of the second energy store ES2 and sets the output signal S101 for this period of time T to the signal level of logic ONE. As a result, the second energy store ES2 is only discharged for the period of time T which is required for removing the excessive electrical charges from the second energy store ES2.

Alternatively, such overcharging of the second energy store can be avoided from the beginning with a voltage limitation circuit with overvoltage protection or an additional thyristor circuit with or without a fusible link, it being possible for said circuits to be arranged in the electrical connections between the two energy systems. When a predetermined charging voltage value is reached in the second energy store, these circuits interrupt the current flow from the generator or from the first energy system to the second energy system and thus prevent overcharging of the second energy store.

The invention claimed is:

1. An on-board electrical system for a vehicle, comprising:
a system load having at least one power consumer;
a first energy store providing current for said system load;
a second energy store providing current for said system load, said second energy store being rechargeable;
a first, controllable switch, producing a first, closed circuit from said first energy store to said system load in a closed switching state;
a second, controllable switch, producing a second closed circuit from said first energy store via said second energy store to said system load in a closed switching state;
a monitoring device for detecting a voltage value at said second energy store and for comparing a detected voltage value with a predetermined voltage threshold value; and
a control device for producing a third, closed circuit from said second energy store via said first switch and said second switch, to an electrical ground, by closing said first switch and said second switch and therefore for discharging said second energy store when the detected voltage value exceeds the predetermined voltage threshold value.

2. The on-board electrical system according to claim 1, further comprising a recharging device for charging said second energy store with a charging current from said first energy store.

3. The on-board electrical system according to claim 2, wherein said control device configured to discharge the charging current via said first, controllable switch and said second, controllable switch to said electrical ground when the detected voltage value exceeds the predetermined voltage threshold value.

4. The on-board electrical system according to claim 1, wherein said monitoring device predetermines the predetermined voltage threshold value depending on at least one parameter related to a charge capacity of said second energy store.

5. The on-board electrical system according to claim 1, wherein said control device keeps said first, controllable switch and said second, controllable switch in the closed switching state for a predetermined period of time, wherein said control device predetermines the predetermined period of time depending on the detected voltage value in comparison with the predetermined voltage threshold value.

6. A control apparatus for controlling a current flow in an on-board electrical system, the control apparatus comprising:
a first electrical terminal, a second electrical terminal and a third electrical terminal for producing electrical connections between the control apparatus and the on-board electrical system;
a first controllable switch, disposed between said first terminal and said second terminal and electrically connecting said first terminal to said second terminal in a closed switching state;
a second controllable switch, disposed between said first terminal and said third terminal and electrically connecting said first terminal to said third terminal in a closed switching state;
a monitoring device for detecting a voltage value between said third terminal and said second terminal and for comparing a detected voltage value with a predetermined voltage threshold value; and
a control device for closing said first controllable switch and said second controllable switch or for holding said first controllable switch and said second controllable switch in the closed switching state when the detected voltage value exceeds the predetermined voltage threshold value.

7. A vehicle with an on-board electrical system, comprising:
an on-board electrical system containing:
a system load having at least one power consumer;
a first energy store providing current for said system load;
a second energy store providing current for said system load, said second energy store being rechargeable;
a first, controllable switch, producing a first, closed circuit from said first energy store to said system load in a closed switching state;
a second, controllable switch, producing a second closed circuit from said first energy store via said second energy store to said system load in a closed switching state;
a monitoring device for detecting a voltage value at said second energy store and for comparing a detected voltage value with a predetermined voltage threshold value; and
a control device for producing a third, closed circuit from said second energy store via said first switch and said second switch, to an electrical ground, by closing said first switch and said second switch and therefore for discharging said second energy store when the detected voltage value exceeds the predetermined voltage threshold value.

* * * * *